June 30, 1936.  H. F. HULL  2,045,777

HYDRAULIC TRANSMISSION

Filed June 11, 1934  2 Sheets-Sheet 1

Inventor
Harry F. Hull
By Lynn H. Latta
Attorney

June 30, 1936.                     H. F. HULL                         2,045,777
                            HYDRAULIC TRANSMISSION
                           Filed June 11, 1934            2 Sheets—Sheet 2

Inventor
Harry F. Hull
By Lynn H. Latta
Attorney

Patented June 30, 1936

2,045,777

UNITED STATES PATENT OFFICE 2,045,777

HYDRAULIC TRANSMISSION

Harry F. Hull, Cherokee, Iowa

Application June 11, 1934, Serial No. 729,951

14 Claims. (Cl. 74—294)

My invention relates to the transmission of the variable geared type.

An object of my invention is to provide the transmission to be used in connection with vehicles which will allow more range of power to be applied to the driving wheels of the same.

A further object of my invention is to provide these means in a construction which will allow the application of the power gradually by means of a suitable control, without the necessity of using gear shift levers.

A further object of my invention is to provide a device of this character which functions through the medium of hydraulic pressure means of simple characteristics.

A further object of my invention is to provide such a device which will insure the power range as well as provide free wheeling features.

A further object of my invention is to provide the above mentioned characteristics in a construction which is relatively easy and simple of manufacture.

With these and other objects in view, my invention consists in the construction, arrangement, and combination of the various parts of my device whereby the objects contemplated are attained as hereinafter more fully set forth, pointed out in my claims, and illustrated in the accompanying drawings, in which:

Figure 1:
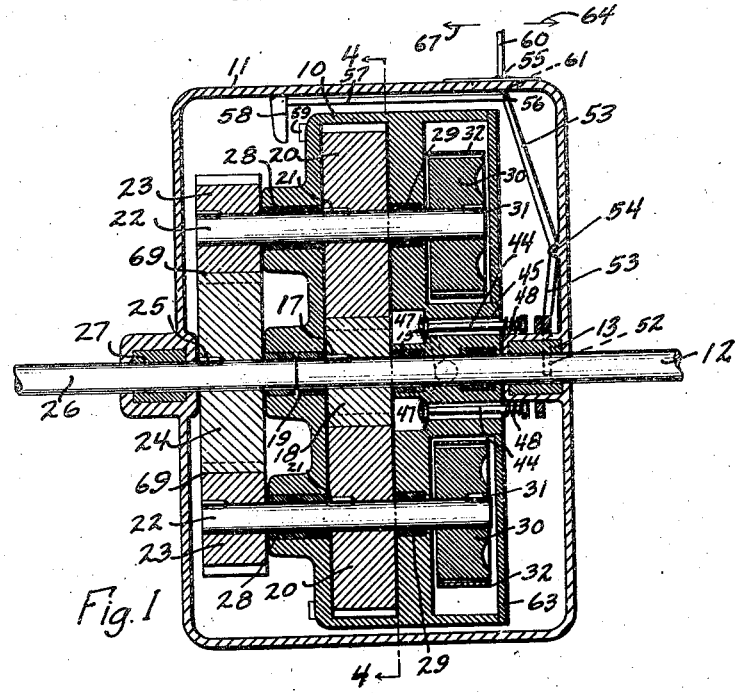
Figure 1 is a sectional view taken medially along the main shafts of the transmission along the lines 1—1 of Figure 4.

I have used the character 10 to designate generally the inner casing of the mechanism. This casing is enclosed within a stationary outer casing 11 which, of course, is suitably secured in any standard method to the vehicle.

The motor shaft is designated by the character 12. This shaft is suitably journalled in the bearing 13 and passes through the hub 14, where it is suitably journalled at 15 and 16, and is pinned at 17 to the small gear 18. This gear is journalled at 19.

The small gear 18 is arranged to mesh with the larger gears 20, which gears are pinned at 21 to the outer shafts 22. Pinned to outer end of these shafts 22 are the reducing gears 23, which in turn are meshed with the large gear 24.

The gear 24 is pinned at 25 to the shaft 26 which is journalled within the bearing 27.

The shaft 26 drives the vehicle wheels and is referred to herein as the driven shaft, while the shaft 12 is referred to as the drive shaft.

The shafts 22 are journalled at 28 and 29, and fixed to the other end of the shafts 22 are the brake drums 30 which are pinned solidly to the shafts at 31.

Figure 5:
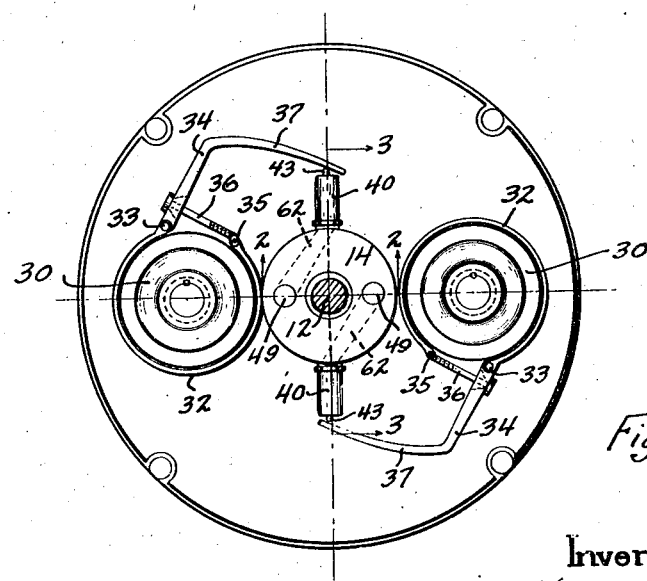
Figure 5 is an external view of the case with the plate removed showing the operating action of the brakes.

Encircling the brake drums 30 are the brake bands 32 (see Figures 1 and 5) which are pivotally connected at 33 to the arms 34, and at 35 to the adjusting members 36.

The inner ends of the arms 34 include the integral extensions 37.

Encasing the outer gears 20 are the integral arcuate portions 38 which terminate in the arcuate portions 39 which surround part of the smaller gear 18.

It will be noted that these arcuate members surround only a part of these gears for reasons which will be explained later, and it will be further noted the gear teeth are in close relation with respect to these members.

The hydraulic cylinders 40 are threadedly engaged at 41 with the hub 14 and slidably engaged within these cylinders are the pistons 42, to which are attached the rods 43.

The rods 43 pass through the upper end of the cylinders and bear against the portions 37.

A pair of valves 44 which pass through openings 45 in the hub 14 and include the valve heads 46 are seated against suitably bevelled faces therein.

The openings 47 communicate directly to the gears 18 and 20.

The valves 44 are retained under pressure against the valve seat by means of the springs 48 which are placed between the disc ends 49 of the valves.

A ring 50 is slidably engaged with the portion 51 and the fork 52 is attached to the extension 53, which extension is pivoted at 54 to the outer casing 11.

The member 53 extends upwardly through the casing at 55 and is pivoted at 56 to the arm 57 which is secured to the member 58.

Attached to the inner casing 10 are the stops 59 which are adapted to co-act with the member 58.

The upper extremity 60 of the member 53 passes to any suitable control button on the dash of the vehicle or in any other desired place, and can be worked forwardly and rearwardly through the slot 61.

The openings 47 communicate with the cylinders 40 by means of the channels 62.

The oil exclusion plate 63 is attached against the inner side of the casing as shown, and is adapted to exclude oil from the brakes and brake bands.

Now that the working elements of the mechanism have been explained, it will be necessary to explain the operation of the device.

When it is desired to throw the mechanism into low gear during starting of the vehicle, the lever 60 is pushed in the direction of the arrow 64.

The member 58 slides in the same direction and is adapted to engage the stops 59 so that the casing 10 will not revolve.

The member 58 is arranged with a suitable ratchet not shown for this so that the casing can only revolve in one direction.

Figures 2, 3:
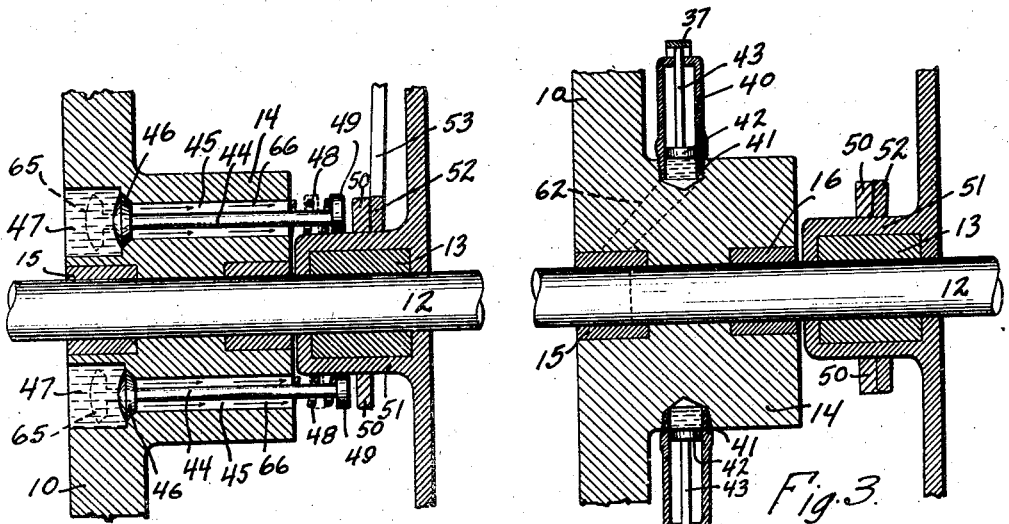
Figure 2 is an enlarged detailed sectional view taken along the lines 2—2 of Figure 5.
Figure 3 is an enlarged detailed sectional view taken along the lines 3—3 of Figure 5.
Figure 4:
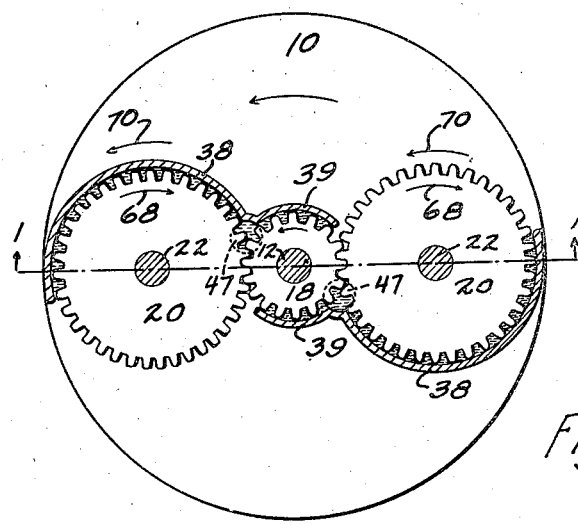
Figure 4 is a sectional view taken along the lines 4—4 of Figure 1.

The fork member 52, during this movement, is moved against the ring 50, which ring moves against the portions 49 of the valve 44, and the valves 44 take the position as shown in the dotted lines 65 in Figure 2.

The oil will then circulate about the gears 18 and 20 and through the openings 45 and in the direction of the arrows 66.

Since the oil is free to travel, as shown, there will be no pressure exerted against the piston 42 and the cylinder 40, and there will be no braking section against the brake drums 30.

The gears 18 will then drive the outer gears 20 which will cause rotation of the gears 23, which in turn will drive the gear 24 and through these gear rotations build up considerable torque in the shaft 26.

This condition will be similar to that of a vehicle in low gear where the engine will run at high speed, yet driving the vehicle wheels with increased power at a lower speed.

To throw the mechanism into medium or high gear, the lever 60 is forced in the direction of the arrow 67.

The following operation then takes place:

The springs 48 force the valves shut, and as the gear 18 rotates, driving the gears 20, oil is carried about the gears 20 in the direction of the arrows 68.

As soon as these particles of oil reach the space enclosed by the arcuate portions 38, it will behave similarly to an oil pump and the oil will be forced under pressure into the openings 47 and thence through the openings or channels 62 to the hydraulic cylinders 40, forcing the piston 42 outwardly, so that the rod 43 will be forced against the arm portion 37 which will tighten the braking bands 32 about the drums 30.

The locking of the brake drums 30 will result in the locking of the gears 20 and the gears 23.

Since these gears will be locked with respect to rotational movement, and since the gear 18 is being revolved by the drive shaft 12, it will be seen that the entire inner casing 10 will revolve with the shaft 12 as a center.

Since the gears 23 are locked, locking will occur at the points 69 between the gears 24 and 23, and for the same reason the shaft 26 will be rotated at the same speed of the casing 10, which in effect is the same speed as the shaft 12.

By virtue of this arrangement, it will be noted that the gradual opening and closing of the valves 44 will result in a gradual application of pressure against the brake drums since the amount of opening of the valves will determine the oil pressure exerted through the channel 62 to the hydraulic cylinders 40.

In this manner a gradual range of power can be applied to the device by merely adjusting the amount of travel of the rod 60.

In case a medium pressure is applied in this way against the brake drums, there will be a correspondingly smaller effect of locking and a medium result between high and low gear will be obtained, and in this manner any desired speed or torque can be applied to the driven shaft 26.

It will be noted further that when the oil travels between the teeth of the gears 18 and 20 against the corresponding casings that the braking action will be assisted at these points by virtue of the pressure exerted thereagainst.

This hydraulic arrangement, therefore, permits of a conveniently adjusted range which eliminates the necessity of intricate mechanical parts.

Other details such as clutches and reverse gears are not shown here since they are not material to the device itself and are well known in the art as well as other stop devices which may be necessary to prevent unnecessary opposite rotation.

This device also will operate a vehicle on the principle of free wheeling, since during free wheeling the casing will be carried in the opposite direction since the vehicle wheels will travel more rapidly with respect to the shaft 12 which is only revolving at an idling speed.

The locking action will not occur since the gears 20 are revolving in the opposite direction as indicated by the arrows 70.

Since the corresponding upper and lower parts of these gears are not adjacent the portions 38 the oil will be carried about within the gear teeth without any pressure being exerted through the oil channels in the valves, etc.

The outer gears will not be locked by virtue of this arrangement and will then rotate freely about the inner gear 18 with the shafts 22 acting as a rotational center, and similarly the gears 23 will rotate freely about their centers and will merely roll about the gear 24 so that the effect of free wheeling will be obtained in this manner.

It will now be seen that I have provided a hydraulic transmission which will allow a gradual range of power to be applied to the vehicle wheels without the necessity of using shift levers or changing any gear ratios.

It will be seen further that I have provided a device of this character which includes free wheeling features.

It will be also noted that I have provided such a device which can be easily and readily controlled from any convenient points, and which is simple and can be manufactured at a reasonable cost.

I claim as my invention:

1. A power transmission comprising a drive shaft, a driven shaft, inner gears attached to the shafts, a revolving casing including outer gears adapted to mesh with the inner gears, and means for locking the outer gears including brake drums attached to the outer gears, means for braking the drums hydraulically including brake bands surrounding the drums, arms attached to the bands, and pistons adapted to be forced against the arms by virtue of hydraulic forcing of oil by the gears within the casing thereagainst.

2. A power transmission comprising a drive shaft, a driven shaft, inner gears attached to the shafts, a revolving casing including outer gears adapted to mesh with the inner gears, and means for locking the outer gears including brake drums attached to the outer gears, means for braking the drums hydraulically including brake bands surrounding the drums, arms attached to the bands, and pistons adapted to be forced against the arms by virtue of hydraulic forcing of oil by the gears within the casing thereagainst, means for holding the casing against reverse rotation.

3. A power transmission comprising a drive shaft, a driven shaft, a central gear attached to the drive shaft, outer gears meshing with the central gear, a casing having openings at the junction of the central and outer gears, means for forcing oil through the openings for causing braking action against the said outer gears, said casing including arcuate portions partially surrounding the periphery of the outer gears to cause pumping of the oil to the said openings, hydraulic cylinders including pistons attached to the casing, channels communicating between the said openings and the said cylinders to cause oil to be forced therein to cause outward forcing of the pistons, brake drums attached to the outer gears, brake bands including extended arms encircling said drums, said arms against which the pistons bear.

4. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons.

5. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons, means for operating said valves.

6. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons, means for operating said valves, including an enlarged integral flange of the valves, tension means against the flange, a ring adapted to bear against said flanges.

7. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons, means for operating said valves, including an enlarged integral flange of the valves, tension means against the flange, a ring adapted to bear against said flanges and a fork for moving said ring.

8. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons, means for operating said valves, including an enlarged integral flange of the valves, tension means against the flange, a ring adapted to bear against said flanges and a fork for moving said ring, pivotal means attached to said fork.

9. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons, means for operating said valves, including an enlarged integral flange of the valves, tension means against the flange, a ring adapted to bear against said flanges and a fork for moving said ring, pivotal means attached to said fork, means for operating said valves to cause oil pressure to be transferred to the pistons through said channels when the valves are closed, and to release said pressure through said openings when the valves are opened.

10. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons, means for operating said valves, including an enlarged integral flange of the valves, tension means against the flange, a ring adapted to bear against said flanges and a fork for moving said ring, pivotal means attached to said fork, means for operating said valves to cause oil pressure to be transferred to the pistons through said channels when the valves are closed, and to release said pressure through said openings when the valves are opened, means for braking said outer gears adapted to co-act with said pistons when said valves are closed to cause locking of the outer gears and to cause rotation of the casing thereof.

11. A power transmission comprising a drive shaft, a driven shaft, a central gear attached to the drive shaft, outer gears, a rotatable casing including an extended hub enclosing said shafts or gears, said hub having openings passing therethrough, valves seated against said openings, said casing having larger openings at one side of the valve heads communicating with said gears, hydraulic pistons attached to the hub, channels between said larger openings and said pistons, means for operating said valves, including an enlarged integral flange of the valves, tension means against the flange, a ring adapted to bear against said flanges and a fork for moving said ring, pivotal means attached to said fork, means for operating said valves to cause oil pressure to be transferred to the pistons through said channels when the valves are closed, and to release said pressure through said openings when the valves are opened, means for braking said outer gears adapted to co-act with said pistons when said valves are closed to cause locking of the outer gears and to cause rotation of the casing thereof, said casing including arcuate portions partially surrounding the periphery of the outer gears to cause pumping of oil through said channels.

12. A power transmission comprising a drive shaft, a driven shaft, inner gears attached to the shafts, outer gears meshing with the inner gears, a pair of said outer gears arranged to pump oil, braking means attached to the said gears, pistons adapted to be operated by the pumped oil to co-act with said braking means, valved means for controlling said oil pressure, a casing enclosing said shafts and said gears adapted to rotate when the said outer gears are locked by the braking means, and to remain in non-rotational position when said braking means are released to increase and transfer power to said driven shaft by the gear ratios.

13. A power transmission comprising a drive shaft, a driven shaft, inner gears attached to the shafts, outer gears meshing with the inner gears, a pair of said outer gears arranged to pump oil, braking means attached to the said outer gears, pistons adapted to be operated by the pumped oil to co-act with said braking means, valved means for controlling said oil pressure.

14. A power transmission comprising a drive shaft, a driven shaft, a central gear attached to the drive shaft, outer gears meshing with the central gear, a casing having openings at the junction of the central and outer gears, braking means attached to the outer gears, pistons for applying said braking means, said casing including arcuate portions partially surrounding the periphery of the outer gears to cause pumping of the oil to the said openings and thence to the said pistons, free wheeling action being imparted to the transmission by virtue of the overrunning of the planetary casing through the release of oil pressure through the non-enclosed portion of said arcuate members.

HARRY F. HULL.